United States Patent Office 3,052,209
Patented Sept. 4, 1962

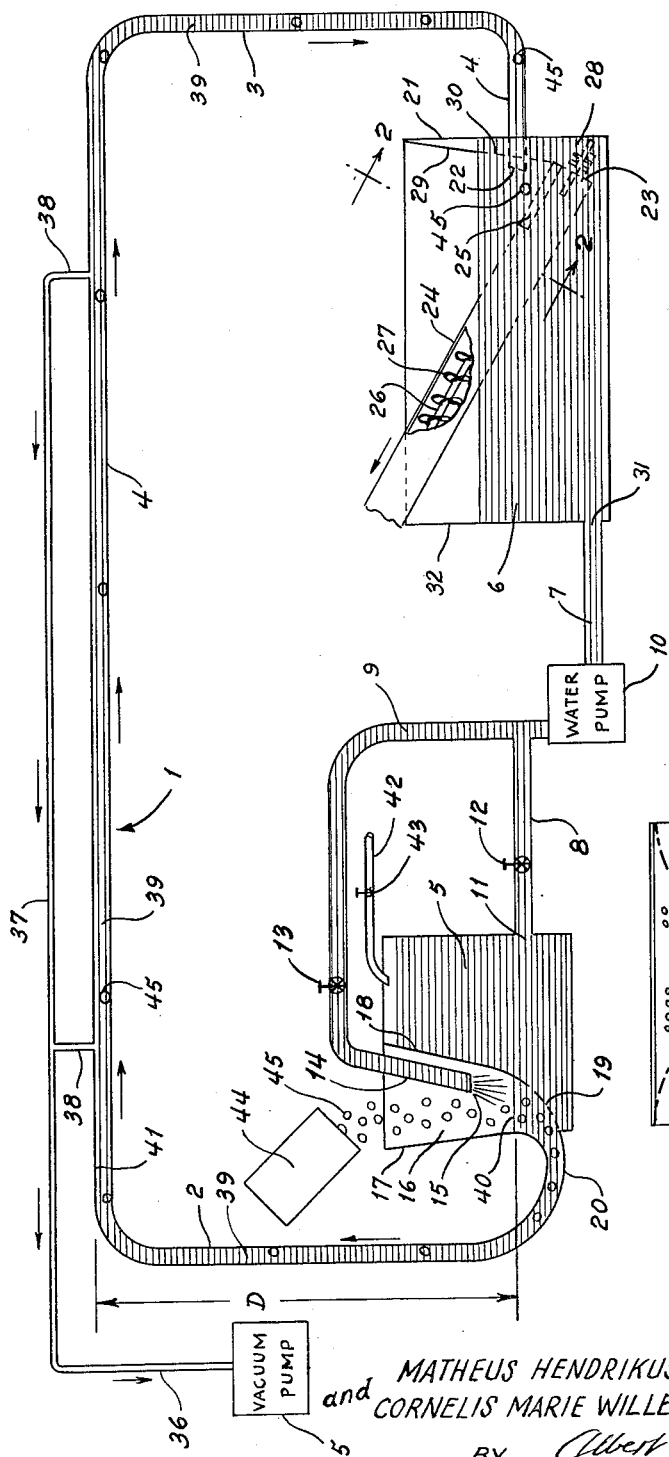

1

3,052,209
APPARATUS FOR EVACUATING NATURAL AND ARTIFICIAL PRODUCTS
Matheus Hendrikus Werther, Hoogeveen, Netherlands, and Cornelius Marie Willem Anton Christ, Saskatoon, Saskatchewan, Canada, assignors to Lucas Aardenburg N.V., Hoogeveen, Netherlands, a corporation of the Netherlands
Filed Dec. 16, 1958, Ser. No. 783,638
4 Claims. (Cl. 118—30)

This invention relates to methods and apparatus for evacuating the gases contained in natural and artificial products and for substituting a liquid for such gases.

This application is a continuation in part of our application Serial No. 533,440, filed September 9, 1955, now abandoned, entitled A Method of Evacuating Natural and Artificial Products and an Apparatus for Carrying Out Said Method.

The apparatus of the invention is capable of being employed for the improving, treating or preparing of a variety of products, of which fruits, vegetables and insulating materials are examples. The variety of products to which the invention is applicable may better be visualized from an appreciation of the fact that the invention is applicable to the treatment of any products sufficiently porous to contain gases, particularly casual gases, wherein such gases are capable of being removed by vacuum action and wherein other substances, such as treating liquids, are used to replace the gases.

In the accompanying drawing and in the description to follow, the example given for illustrating the apparatus of the invention will be the treatment of fruit, in the course of preserving the same, by the removal of air therefrom and the replacement of air by water. It is to be clearly understood, however, that the giving of such example is for the providing of a specific embodiment of a product in connection with which the apparatus of the invention are operable. Reference to such embodiment for illustrating the invention is to be understood as being for illustrative and not for limiting purposes.

In the methods heretofore employed for the improving, treating, or preparing of appropriate products, such as in the preserving of vegetables or fruit, or in the impregnating of porous or artificial products, such as insulating material, involving the dispelling of the gases therefrom and the replacing of the same by a suitable liquid, the practice has been to place the articles in a vessel and evacuate that vessel. Examples of such treatment are illustrated in the United States patents to Todd #1,890,475 of December 13, 1932, and that to Guadagni #2,702,248 of February 15, 1955. In the teachings of those patents, as well as in all of the other known prior art, the product to be treated is placed in a vessel which is sealed. A vacuum or partial vacuum is pulled in the sealed chamber and the liquid is introduced to replace the gases removed from the product by the vacuum action.

There are many drawbacks to such prior art systems, but, until the advent of the instant invention, no way had been found to eliminate them. In the first place, the prior art requires that each time products are to be treated, the vessel containing them must be opened, filled, closed and then reopened and emptied. This is extremely time consuming, also involves a high degree of care on the part of the operator in connection with such things as the accurate sealing of the vessel. If production of any volume is to be achieved, very substantial apparatus is required and skilled labor is needed.

It is, accordingly, an object of the invention to obviate the prior art drawbacks by providing an improved apparatus for effecting gas evacuation and liquid penetration of various products.

Another object is to effect such evacuation and penetration on a continuous basis.

Still another object is to effect such evacuation and penetration in a simple, straightforward and fool-proof manner.

A further object is to combine the transporting and treating of products with the continuous evacuation and penetration of them.

Still further objects are to reduce the power needed for the gas evacuation and impregnation of products while greatly increasing the capacity for treatment of such products.

Further and more detailed products will in part be obvious and in part be pointed out as the description of the invention taken in conjunction with the accompanying drawing proceeds.

In that drawing:

FIG. 1 is a diagrammatic sectional view of apparatus in accordance with the invention and for carrying out the method thereof; and FIG. 2 is a fragmentary section taken on line 2—2 of FIG. 1 and looking in the direction of the arrows.

Basically, the apparatus of the invention comprises a U shaped tube, generally indicated at 1, having a pair of downwardly extending legs 2 and 3 at the ends of the horizontal intermediate portion 4. A liquid lock 5 is provided at the lower end of the leg 2, such being the entrant end of the system, and another liquid lock 6 is provided at the lower end of the leg 3 at the exit end of the system.

The locks 5 and 6 are interconnected by suitable piping sections 7, 8, and 9, in combination with a suitable liquid, or water pump 10. The pipe 7, in the form of a return from the lock 6, terminates in the pump 10 while the pipe 8 extends from the pump 10 into the lock 5 adjacent the lower portion thereof at the position 11. This pipe has a valve 12 in its line to control the flow therethrough. The pipe 9 extends upwardly, has a valve 13 positioned in it, and, beyond the valve 13 extends downwardly in the portion 14 which terminates in an open end 15 at a position well below the top level of the liquid in the lock 5.

The portion 14 of the pipe 9 is received in a funnel like portion 16 of the lock 5. This funnel portion 16 is formed by opposed walls 17 and 18, the wall 17 of which forms the end wall of the lock, while the wall 18 serves as a partition extending within the lock. Important to note, however, is that adjacent its lower end, the wall 18 is perforated at 19 so that the liquid from the lock may flow into the lower portion of the funnel. From the funnel portion 16 a conduit portion 20 extends outwardly and upwardly to join with the upwardly directed leg 2.

At the opposite end of the system, the leg 3 has its lower portion turned inwardly to extend through the end wall 21 of the lock 6 and terminate at the position 22 within the same.

A worm conveyor is provided for removing treated products from the lock 6. This conveyor, which extends diagonally from a position 23 closely adjacent the lower end of the wall 21 of the lock 6, inclines upwardly therefrom to exit from the lock at the far upper portion thereof. As here illustrated, such conveyor is constructed with an enclosing tube 24 broken away at 25 to permit the entrance of products thereinto, while the interior of the tube is equipped with a suitable shaft 26 carrying a helical drive blade 27.

Suitable supporting means for the lower end of the shaft 26 is provided at 28 and it is also to be noted that a plate member 29, perforated throughout as seen at 30, extends down into the lock 6 from the upper end of the wall 21 thereof, and overlies the tube 24 along its length to assure that products coming out of the pipe end 22 will be directed into the conveyor tube 24 through the opening 25 and cannot be carried by the flow of the liquid to the exit opening 31 where the return pipe 7 extends out through the left hand end wall 32 of the lock 6.

Another important aspect of the apparatus is the provision for pulling a vacuum in the tube 1. This is accomplished by a suitable vacuum pump 35 at the end of a pipe 36 whose horizontal portion 37 overlies the tube portion 4 and has suitable connecting sections 38 extending downwardly and communicating with the interior of the tube portion 4. Here it is important to note that the vacuum pulled by the pump 35 not only serves to draw the casual gases out of the products to be evacuated as they pass along through the tube 1 in the direction of the arrows, but it also causes the liquid 39 to extend up through the legs 2 and 3 and fill the tube 1. In order for the necessary vacuum to be created in the tube 1 without the vacuum system sucking the liquid out of that tube, the maintenance of a proper head in the system is important. This head is indicated at D in the drawing and it is the surface 40 of the liquid in the funnel 16 and the upper surface 41 of the liquid within the tube portion 4. For the proper head to be established and maintained as the operation proceeds, when water is used as the liquid, the distance D needs to be 10.3 meters. This distance needs to be varied when the liquid is lighter, or heavier, than water, with such variations being readily calculable by one skilled in the art.

For replenishing the water supply in the system, a water pipe 42 is positioned with its terminating end within the confines of the lock 5. This pipe has a suitable valve 43 for controlling the flow of water therethrough.

Any suitable means may be employed for introducing the products to be evacuated into the funnel 16. As here shown a container 45 is merely tilted up over the upper end of the funnel so that the products 45 will fall thereinto. This could, of course, be suitable conveying or hopper means.

Considering now the method of the invention and the manner of operation of the illustrative apparatus from the standpoint of the liquid 39 used being water and the product to be acted upon being a suitable fruit, the first thing to do is to fill the system with water. This is done by admitting water into the locks 5 and 6 and operating the vacuum pump 35 to cause the water 39 to fill the legs 2 and 3 and the horizontal portion 4. When the entire system is filled with water, the pump 10 is started to create a flow in the system according to the direction of the arrows. Water thus flows from the lock 6 through the line 7 and through the pump 10. There it splits and goes through either, or both of the pipes 8 and 9, depending upon the position of the valves 12 and 13. Principally, however, the flow is through the line 9 since the objective is to create a strong downward jet of water coming out of the end 15 of the pipe section 14. The action of this jet stream is controllable by the valve 13, the same as the flow through the pipe section 8 is controlled by the valve 12.

With the jet in operation the products 45 dropped into the funnel 16 are forced into the stream of water through the surface 40 and are carried along by that stream. The flow of the water in the tube 1 thus serves as the conveying means for carrying the products 45 through the system and along the horizontal path 4. As the product passes along, the air in it is sucked out by the action of the vacuum pump. This is particularly true during passage of the product through the horizontal section 4 and when the product leaves that section the air has largely been evacuated from it. The product then descends through the downwardly directed leg 3 into the exit reservoir or lock 6. During such descent and while in the exit reservoir the product absorbs water to fill the spaces which had previously contained air.

The product is then removed from the exit reservoir by means of the worm conveyor 26—27, being retained in position to fall into that conveyor by the plate member 29, which, while permitting flow of liquid through its perforations, prevents the products from reaching the exit end 31 of the lock. The products emerging from the worm conveyor may then be taken away in any suitable manner for subsequent treatment.

As already pointed out, the use of water as the liquid and fruit as the product to be treated are merely illustrative of one form of fluid medium and one form of product out of a substantial variety to which the invention is applicable. Also, the apparatus shown is illustrative of the presently preferred embodiment of the invention, but the showing of such embodiment is also for the purpose of illustrating the principles of the invention and the manner in which the method of the same is carried out.

Speaking more generally, since certain changes in carrying out the disclosed method and in the construction set forth which embody the invention may be made without departing from its scope, it is intended that all matter contained in the above description or shown in the accompanying drawing shall be interpreted as illustrative and not in a limiting sense.

Having described our invention, what we claim as new and desire to secure by Letters Patent is:

1. Apparatus operable on a continuous basis for evacuating the gases from natural and artificial products and for substituting a liquid in place of the evacuated gas, which comprises, an inverted U-shaped tube for the passage of such product, said U-shaped tube having a pair of leg portions and a joining portion joining said leg portions, means to create a vacuum in said joining portion, liquid locks on the free ends of said leg portions providing for the introduction of said product at one end of said tube and withdrawal of the same at the other end of said tube without loss of vacuum, funnel means formed in the introducing one of said liquid locks for introducing said product at said one end of said tube, conduit means separated from said U-shaped tube for interconnecting said liquid locks, and means for causing the circulation of liquid through said locks, said conduit means and said U-shaped tube, said conduit means having a branch extending into and terminating within said funnel means for emitting a jet of liquid therein.

2. Apparatus operable on a continuous basis for evacuating the casual gases from natural and artificial products and for substituting a liquid in place of the evacuated gas which comprises, an entrance reservoir in the form of a tank, a partition wall within said tank extending downwardly thereinto and forming with one of the boundary walls of said tank a funnel for the reception of products to be treated, the lower part of said partition wall being formed with perforations therethrough, a conduit extending outwardly from the lower end of said funnel and upwardly from its commencing position to a substantial height, a horizontal conduit communicating with said upwardly extending conduit at the upper end thereof and extending for a substantial distance horizontally and a downwardly extending conduit at the remote end of said horizontal conduit, a receiving tank, the lower end of said downwardly extending conduit terminating in said receiving tank, a vacuum system including a vacuum pump and a vacuum conduit extending therefrom, said vacuum conduit having leg portions and said leg portions communicating with said horizontal conduit at spaced positions along the upper portion thereof, liquid recirculating conduit means extending between said receiving tank and said entrance reservoir and pump means in the line of said recirculating conduit for returning the liquid received in said receiving tank to said entrance reservoir.

3. Apparatus as in claim 2 and including means for introducing products to be treated into said funnel and means for forcing said products from said funnel into said upwardly extending conduit, said forcing means including jet means formed at one end of said recirculating conduit means.

4. Apparatus as in claim 2 and including means in said receiving tank for isolating products received therein from the opening for said recirculating conduit and conveyor means for conveying such products out of said receiving tank.

References Cited in the file of this patent

UNITED STATES PATENTS

| | | |
|---|---|---|
| 192,595 | Palen et al. | July 3, 1877 |
| 1,080,469 | Murray | Dec. 2, 1913 |
| 1,252,535 | Baudry | Jan. 8, 1918 |
| 1,325,991 | King | Dec. 23, 1918 |
| 1,890,475 | Todd | Dec. 13, 1932 |
| 1,938,060 | Wood | Dec. 5, 1933 |
| 2,012,969 | Miller | Sept. 3, 1935 |
| 2,241,737 | Romberg | May 13, 1941 |
| 2,364,400 | Stewart et al. | Dec. 15, 1944 |
| 2,689,182 | Richert | Sept. 14, 1954 |
| 2,702,248 | Guadagni | Feb. 15, 1955 |